US009947169B2

(12) United States Patent
Sugiyama

(10) Patent No.: US 9,947,169 B2
(45) Date of Patent: Apr. 17, 2018

(54) OPERATION UNIT AND GAME MACHINE

(71) Applicant: OMRON Corporation, Kyoto-shi, Kyoto (JP)

(72) Inventor: Hiroaki Sugiyama, Hashima-gun (JP)

(73) Assignee: OMRON Corporation, Kyoto-shi (JP)

( * ) Notice: Subject to any disclaimer, the term of this patent is extended or adjusted under 35 U.S.C. 154(b) by 160 days.

(21) Appl. No.: 15/153,063

(22) Filed: May 12, 2016

(65) Prior Publication Data

US 2016/0364942 A1 Dec. 15, 2016

(30) Foreign Application Priority Data

Jun. 15, 2015 (JP) ................................ 2015-120108

(51) Int. Cl.
*A63F 13/24* (2014.01)
*G07F 17/32* (2006.01)

(52) U.S. Cl.
CPC ................................ *G07F 17/3209* (2013.01)

(58) Field of Classification Search
CPC ...... G07F 17/3209; A63F 13/20; A63F 13/24; A63F 2300/10; A63F 2300/1043
USPC ............................................................ 463/37
See application file for complete search history.

(56) References Cited

U.S. PATENT DOCUMENTS

| | | | | |
|---|---|---|---|---|
| 2001/0007449 | A1* | 7/2001 | Kobachi | G01S 7/4811 345/156 |
| 2009/0201655 | A1* | 8/2009 | Watanabe | H01H 13/20 361/781 |
| 2011/0032212 | A1* | 2/2011 | Lan | G06F 3/03548 345/175 |
| 2014/0179429 | A1 | 6/2014 | Okazaki et al. | |

FOREIGN PATENT DOCUMENTS

| | | |
|---|---|---|
| JP | 2013-009851 A | 1/2013 |

* cited by examiner

*Primary Examiner* — Allen Chan
(74) *Attorney, Agent, or Firm* — Metrolexis Law Group, PLLC

(57) ABSTRACT

An operation portion support portion that moves in a Z direction in response to a pressing operation performed by a user, a first slide portion that is arranged at a position covering the periphery in the X direction and Y direction of the operation portion support portion and moves in the Y direction, which is orthogonal to the Z direction, due to the operation portion support portion moving in the Z direction, a second slide portion that is arranged at a position adjacent in the Y direction to the first slide portion and moves in the X direction, which is orthogonal to the Z direction and Y direction due to the first slide portion moving in the Y direction, and a biasing member that biases the second slide portion in the −X direction are included.

8 Claims, 8 Drawing Sheets

OPERATION UNIT AND GAME MACHINE

CROSS-REFERENCES TO RELATED APPLICATIONS

This application claims priority to Japanese Patent Application No. 2015-120108 filed Jun. 15, 2015, the entire contents of which are incorporated herein by reference.

FIELD

The present invention relates to an operation unit that receives a pressing operation from a user, and a game machine including the same.

BACKGROUND

Conventionally, game machines known as so-called slot machines have existed. A slot machine is such that multiple reels displaying multiple types of symbols rotate, a scoring combination is determined according to how the symbols displayed in a window are aligned and which symbols are aligned when the reels stop, and a prize is given according to the determined scoring combination and a bet number. Note that an operation of inputting a bet number and an operation of starting the rotation of the reel are performed using an operation unit provided on the front surface of the slot machine.

Incidentally, slot machines are arranged in game facilities such as casinos. However, slot machines manufactured not just by one manufacturer, but by various manufacturers are arranged in game facilities. A player selects a machine of the player's preference from among the slot machines of the various game machine manufacturers and plays a game. For this reason, slot machines that are popular among gamers are arranged in game facilities in order to ensure predominance over other competing game facilities.

In order to meet demand from the game facilities, the game machine manufacturers make an effort to develop slot machines that will appeal to the players. In such circumstances, the operation unit on the front surface of the slot machine is regarded as being highly important because it is at a conspicuous location and allows the gamer to perform direct operation of the slot machine.

Incidentally, because slot machines are bought and sold all over the world, display on the operation unit needs to be adapted to foreign languages. For this reason, prior operation units were configured such that top surface covers of buttons could be removed using a tool such as a screwdriver and a sheet corresponding to a foreign language could be inserted below the top surface cover. However, the inconvenience of removing the top surface covers was large, and there was concern that trouble such as the buttons being damaged by the tool would occur.

In view of this, in recent years, thin display apparatuses such as LCDs (liquid crystal display panels) that can freely change display have often been used in operation units.

For example, JP 2013-9851A (Patent Document 1) discloses an operation unit that includes a transparent operation button arranged at a position overlapping with the display screen of the LCD (liquid crystal display panel) and detects a pressing operation of a user on the display screen of the LCD using the operation button.

Specifically, the operation unit disclosed in JP 2013-9851A includes rubber serving as an elastic member between the operation button including a contact point pressing portion, and a circuit board including a carbon contact point. Also, when a pressing operation is performed on the operation button, a protrusion provided at a position corresponding to the contact point pressing portion of the operation button on the rubber is pressed in by the contact point pressing portion, and the carbon contact point of the circuit board is pressed. Accordingly, an intuitive operation feeling (clicking feeling) is provided to the user and the pressing operation is sensed.

JP 2013-9851A (made available to the public on Jan. 17, 2013) is an example of related art.

SUMMARY

However, with the configuration disclosed in JP 2013-9851A, the rubber serving as the elastic member needs to be arranged between the operation button and the circuit board, and therefore the thickness of the operation unit increases. For this reason, in the configuration disclosed in JP 2013-9851A, when a user views the display image of the LCD via the operation button, the display image of the LCD appears further away by an amount corresponding to the thickness of the operation unit.

The present invention has been achieved in view of the foregoing problems, and it is an object thereof to provide an operation unit including a thin operation button that can provide a user with an intuitive operation feeling (a clicking feeling), and a game machine including the same.

An operation unit according to an aspect of the present invention includes: a button portion configured to move in a first direction, which is a pressing direction, in response to a pressing operation performed by a user; a first slide portion that is arranged around the button portion and is configured to move in a second direction orthogonal to the first direction due to the button portion moving in the first direction; a second slide portion that is arranged at a position adjacent in the second direction to the first slide portion and is configured to move in a third direction orthogonal to the first direction and the second direction due to the first slide portion moving in the second direction; and a biasing member that biases the second slide portion in a direction of preventing movement in the third direction of the second slide portion.

With the above-described configuration, when the user performs a pressing operation on the button portion, the button portion moves in the first direction in response to the pressing operation, the first slide portion moves in the second direction in response to the movement of the button portion, and the second slide portion overcomes the biasing force of the biasing member in response to the movement of the first slide portion and moves in the third direction. Accordingly, an intuitive operation feeling (clicking feeling) can be provided to the user. Also, because the first slide portion, the second slide portion, and the elastic member can be arranged at positions around the button portion in a view in the first direction, the operation unit can be made thinner than the configuration in which an elastic member such as rubber is arranged on the rear surface of the operation button.

Also, a configuration may be used in which the button portion includes a protrusion that protrudes in a direction approximately parallel with the third direction, the first slide portion includes a notch configured to contain the protrusion, on a surface on the second direction side of the notch, the notch includes a first inclined portion that is inclined so as to be located further away from the second slide portion the further in the first direction it is, and due to the protrusion sliding against the first inclined portion when the button portion moves in the first direction in response to a pressing operation performed by a user, the first inclined portion is pressed by the protrusion, and the first slide portion moves in the second direction.

According to the above-described configuration, the first slide portion can be moved appropriately in the second direction in response to the movement in the first direction of the button portion.

Also, a configuration may be used in which the button portion includes a plurality of said protrusions that protrude in the third direction and a plurality of said protrusions that protrude in a direction opposite to the third direction, and the first slide portion includes a plurality of said notches in correspondence with the protrusions.

According to the above-described configuration, the plurality of protrusions of the button portion and notches of the first slide portion are provided on a surface orthogonal to the first direction. For this reason, a load that acts on the first slide portion due to the movement of the button portion can be applied in a manner of being dispersed over multiple positions on a surface orthogonal to the first direction. Accordingly, the first slide portion can be moved parallel to the second direction without causing a rotation to occur in the first slide portion. Accordingly, the button portion can be moved smoothly in a direction parallel to the pressing direction without causing tilting of the button portion to occur. For this reason, the operability of the button portion can be improved.

Also, a configuration may be used in which, on a surface opposing the second slide portion, the first slide portion includes a second inclined portion that is inclined so as to be located more toward a side opposite to the third direction the further in the second direction it is, at a position of coming into contact with the second inclined portion, the second slide portion includes a third inclined portion that is formed approximately parallel to the second inclined portion, and due to the second inclined portion sliding against the third inclined portion when the first slide portion moves in the second direction, the third inclined portion is pressed by the second inclined portion, and the second slide portion moves in the third direction.

According to the above-described configuration, the second slide portion can be moved appropriately in the third direction in response to the movement in the second direction of the first slide portion.

Also, a configuration may be used in which the first slide portion includes a plurality of said second inclined portions at positions separated by a predetermined gap in the third direction, and the second slide portion includes a plurality of said third inclined portions in correspondence with the second inclined portions.

According to the above-described configuration, the load applied to the second slide portion due to the movement of the first slide portion is applied in a manner of being dispersed over multiple positions in the third direction on the second slide portion. Accordingly, the second slide portion can be moved horizontally to the third direction without causing a rotation to occur in the second slide portion. Accordingly, the button portion, the first slide portion, and the second slide portion can be moved smoothly.

Also, a configuration may be used in which, when the pressing operation performed by the user is released, due to the biasing force of the biasing member, the second slide portion, the first slide portion, and the button portion are caused to return to a predetermined location that is the same as a position prior to a pressing operation being started.

According to the above-described configuration, when the pressing operation is released, due to the biasing force of the biasing member, the portions of the operation unit can be automatically returned to a state that is the same as the state prior to the pressing operation being started.

Also, a configuration may be used in which a display portion arranged at a position on the first direction side relative to the button portion is included, at least a portion of the button portion is a light transmitting portion composed of a material with a property of transmitting light, and an image displayed on the display unit can be viewed via the light transmitting portion.

According to the above-described configuration, the operation unit can be made thinner and the distance between the button portion and the display portion can be made shorter, and therefore it is possible to suppress the occurrence of a reduction in the display quality in which the display image appears further away due to the thickness of the button portion.

A game machine of the present invention includes one of the operation units described above.

According to the above-described configuration, it is possible to realize a game machine that includes a thin operation unit that can provide a user with an intuitive operation feeling (clicking feeling).

According to the present invention, it is possible to realize a thin operation unit that can provide a user with an intuitive operation feeling (clicking feeling), and a game machine including the same.

DETAILED DESCRIPTION

An embodiment of the present invention will be described. Note that in the present embodiment, an example of a case in which the present invention is applied to an operation unit of a slot machine, which is a type of game machine, will be described. However, the object to which the present invention is applied is not limited thereto, and for example, the present invention can be used as the operation unit of another game machine such as a personal computer or a game device, various types of industrial devices, or various types of consumer devices.

Figure 1:
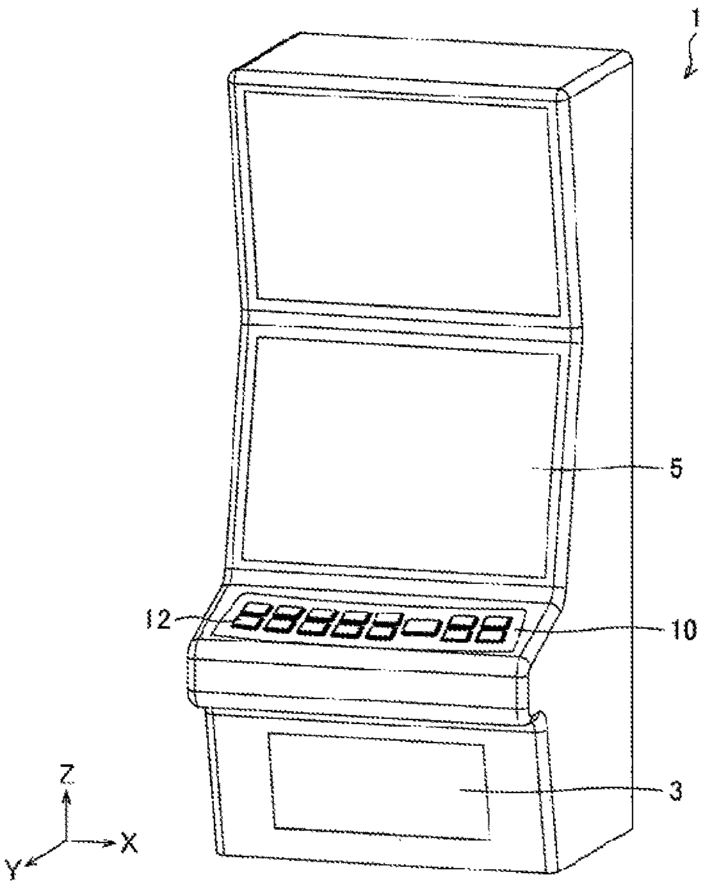
FIG. 1 is an overall perspective view of a game machine including an operation unit according to an embodiment of the present invention.

FIG. 1 is an overall perspective view of a slot machine 1 including an operation unit 10 according to the present embodiment. As shown in FIG. 1, the slot machine 1 includes a main display portion 5 at a central portion on a front surface facing a player (operator).

A main display portion 5 is composed of a display means such as a liquid crystal display panel and displays multiple reels (not shown) displaying multiple types of symbols according to control performed by a control unit (not shown) of the slot machine 1. The multiple reels start rotating due to a player performing a pressing (pressing down) operation on a predetermined operation button 12 for instructing the reels to start rotating, among multiple operation buttons 12 included on the operation unit 10 provided below the main display portion 5. The reels automatically stop due to the control unit of the slot machine 1 (or stop due to the player performing a pressing operation on an operation button 12 for stopping the rotation of the reels), and a scoring combination is determined according to how the symbols displayed on the main display portion 5 are aligned and which symbols are aligned when the reels stop. A prize is given to the player according to the determined scoring combination and a bet number. The bet number is input by performing a pressing operation on an operation button 12 provided on the operation unit 10. A receiving tray 3 for receiving medals paid out according to the prize is provided below the operation unit 10. Note that in the present embodiment, the reels are displayed on the main display portion 5, but there is no limitation to this, and actual reels may be rotatably arranged instead of the main display portion 5.

The operation unit 10 receives an operation from the player and transmits the operation to the control unit of the slot machine 1. In the present embodiment, the operation unit 10 receives an operation for designating a bet number, an operation for starting rotation of the reels, and the like, when the player plays the slot machine 1.

Figure 2:
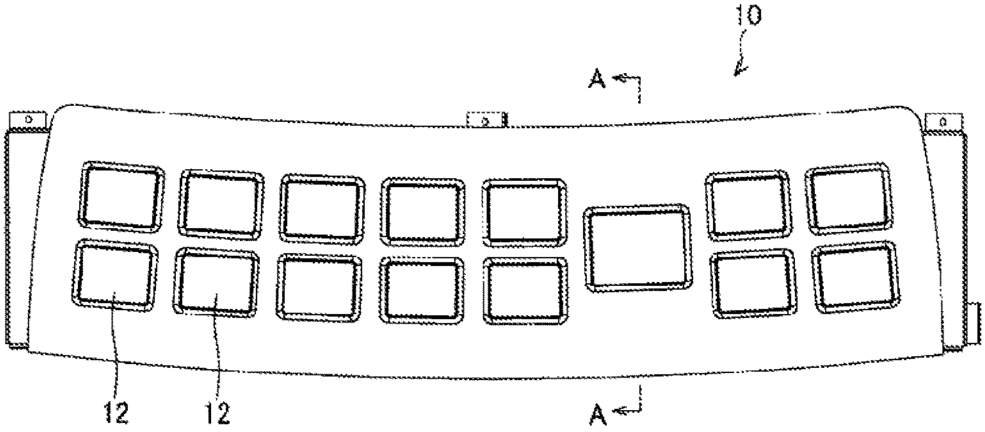
FIG. 2 is a top view showing the exterior of an operation unit according to an embodiment of the present invention.
Figure 3:
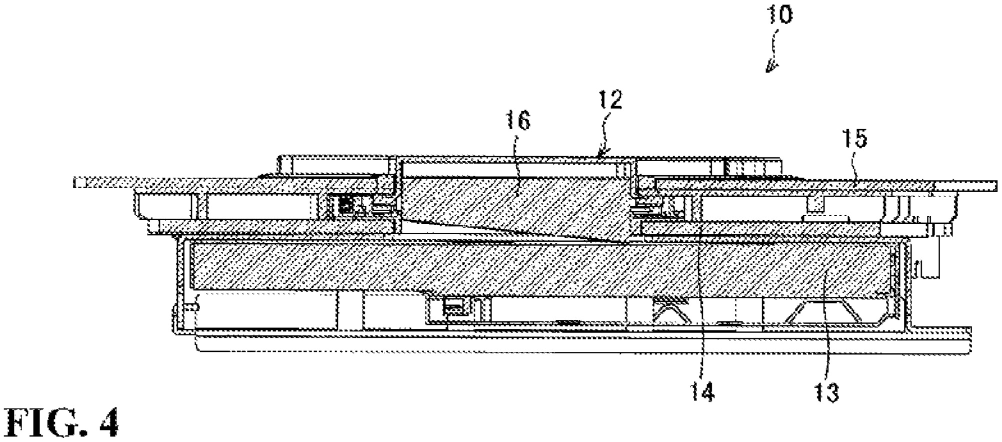
FIG. 3 is a cross-sectional view taken along line A-A in FIG. 2.

FIG. 2 is a top view showing an exterior of the operation unit 10. FIG. 3 is a cross-sectional view taken along line A-A in FIG. 2, of the operation unit 10.

As shown in FIG. 3, the operation unit 10 includes a liquid crystal display panel 13, a PCB (printed circuit board) 14, a cover 15, lenses 16, and the operation buttons 12.

The liquid crystal display panel (display unit) 13 has an approximately rectangular display screen and displays images in regions corresponding to the operation buttons 12 in accordance with an instruction from the control unit of the slot machine 1. Note that the liquid crystal display panel is used as a display unit in the present embodiment, but there is no limitation to this, and for example, a display unit composed of another configuration such as organic EL (electroluminescence) may be used.

The operation buttons 12 are arranged so as to oppose the display screen of the liquid crystal display panel 13 via the lenses 16. Also, the regions opposing the lenses 16 of the operation buttons 12 are formed using members with a property of transmitting light. Accordingly, the images displayed on the liquid crystal display panel 13 are visible to the player via the lenses 16 and the operation buttons 12.

When a pressing operation is performed on an operation button 12, the PCB 14 senses the pressing operation and transmits the pressing operation to the control unit of the slot machine 1.

Specifically, the PCB 14 is arranged such that openings are formed in regions corresponding to the lenses 16 arranged between the operation buttons 12 and the liquid crystal display panel 13 and the edges of the openings overlap with the edges of the operation buttons 12. Also, contact point pressing portions 27 (see FIG. 5B, which will be described later) that protrude toward the PCB 14 are provided at the four corners of the bottom surface (surface opposing the PCB 14) of each operation button 12, and contact sensing portions (not shown) are provided at positions corresponding to the contact point pressing portions 27 in the PCB 14. Accordingly, when the operation button 12 is pressed down, the contact point pressing portions 27 of the operation button 12 come into contact with the contact sensing portions of the PCB 14, and thus a pressing operation of the operation button 12 is sensed and transmitted to the control unit of the slot machine 1.

The cover 15 is arranged so as to cover regions other than the operation buttons 12 on the upper surface of the operation unit 10.

Figure 4:
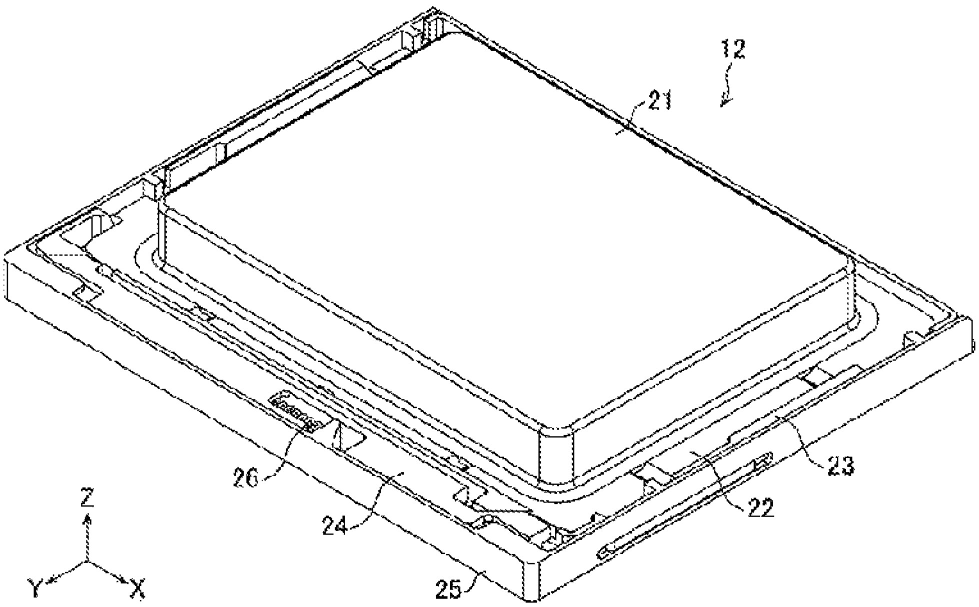
FIG. 4 is a perspective view of an operation button included in the operation unit shown in FIG. 2.
Figure 5A:
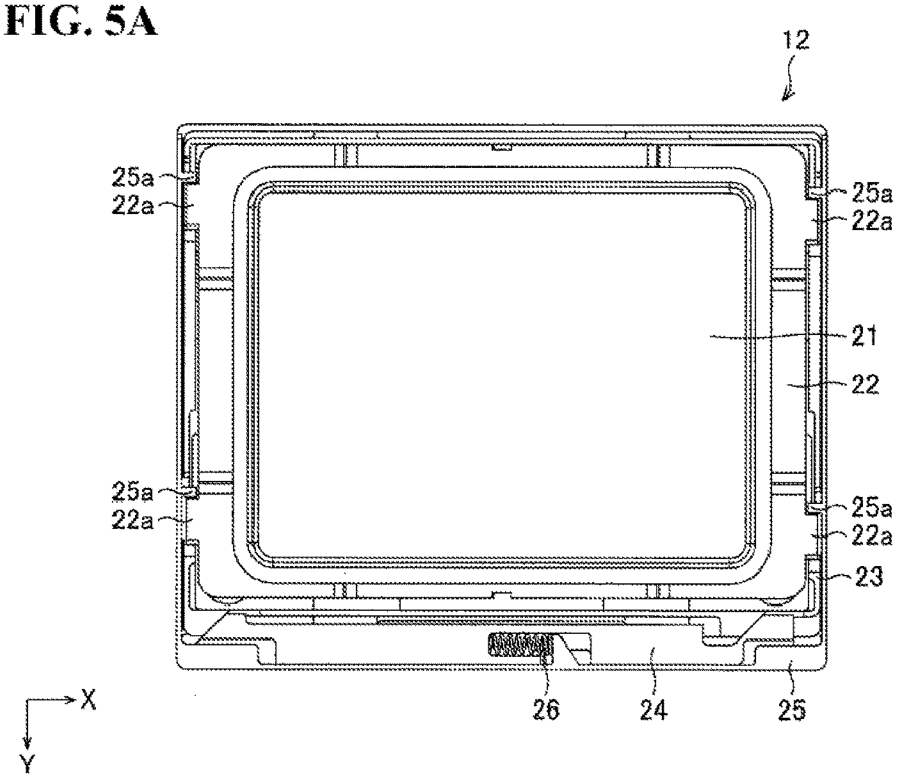
FIG. 5A is a top view of the operation button shown in FIG. 2.
Figure 5B:
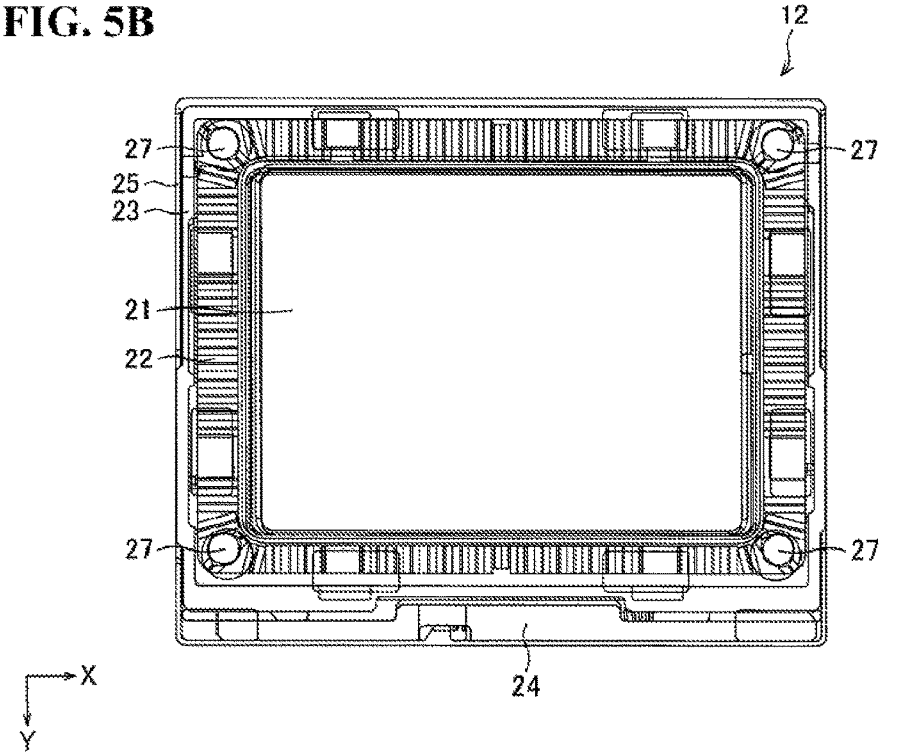
FIG. 5B is a bottom view thereof.
Figure 6:
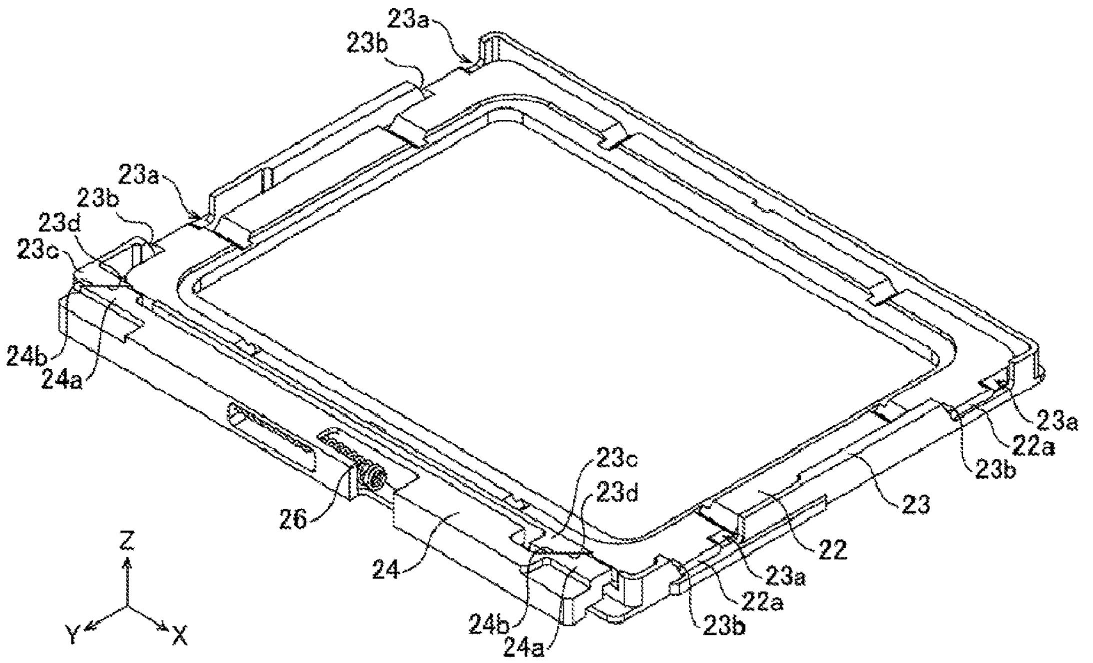
FIG. 6 is a diagram illustrating a relationship between an operation portion support portion, a first slide portion, and a second slide portion, which are included in the operation button shown in FIG. 2.

FIG. 4 is perspective view of an operation button 12. Also, FIG. 5A is a top view of an operation button 12, and FIG. 5B is a bottom view of an operation button 12. FIG. 6 is a diagram illustrating a relationship between an operation portion support portion 22, a first slide portion 23, and a second slide portion 24, which are included in an operation button 12.

As shown in these drawings, the operation button 12 includes an operation portion 21, the operation portion support portion 22, the first slide portion 23, the second slide portion 24, a frame portion 25, a biasing member 26, and the contact point pressing portions 27.

The operation portion (light transmitting portion) 21 is composed of a member with a property of transmitting light (e.g., a transparent resin material, a milky white resin material, or the like) and is box-shaped with an approximate parallelepiped shape that is open on the bottom surface side. When the player performs a pressing operation on the operation button 12, the player touches the upper surface of the operation portion 21 and presses it down. Note that in the present embodiment, due to the operation portion 21 being constituted by a member with a property of transmitting light, the user can view the image displayed on the liquid crystal display panel 13 via the operation portion 21.

The operation portion support portion 22 is a frame-like member fixed to the circumferential edge on the bottom surface side of the operation portion 21, and is arranged in the form of a brim that protrudes outward of the operation portion 21 from the circumferential edge of the operation portion 21 in a view from above (Z direction in the drawing). A button portion that moves integrally in a pressing direction in response to a pressing operation performed by the player is formed by the operation portion 21 and the operation portion support portion 22. Note that in the present embodiment, the operation portion 21 and the operation portion support portion 22 are constituted by separate members and are fixed to each other, but there is no limitation to this, and it is possible to use a button portion in which the operation portion 21 and the operation portion support portion 22 are formed integrally.

Also, each of the two mutually-opposing side surfaces (two side surfaces in the X direction in the drawing) of the operation portion support portion 22 is provided with two protruding portions 22*a* that protrude outward in a horizontal direction (X direction) with equal gaps therebetween on both side surfaces.

Also, as shown in FIG. 5B, the contact point pressing portions 27 that protrude toward the PCB 14 are provided at the four corners on the bottom surface side of the operation portion support portion 22.

The first slide portion 23 is a frame-like member that is arranged so as to surround the operation portion support portion 22 in a view from above (Z direction in the drawing). Notches 23*a* that are formed so as to accommodate the protrusions 22*a* are provided at positions on the first slide portion 23 that correspond to the protrusions 22*a* of the operation portion support portion 22. Also, two protrusions 23*c* that protrude toward the front surface are provided on the side surface on the front surface side (Y direction in the drawing) of the first slide portion 23.

The second slide portion 24 is arranged at a position opposing the first slide portion 23 on the front surface side (Y direction in the drawing), and protrusions 24*a* that protrude toward the first slide portion 23 are provided at positions adjacent in the X direction in the drawing to the protrusions 23*c* of the first slide portion 23.

The frame portion 25 is fixed to a housing (not shown) of the operation unit 10. Also, the frame portion 25 supports the first slide portion 23 so as to allow movement within a predetermined range in the Y direction and restrict movement in the X direction and Z direction. Also, the frame portion 25 supports the second slide portion 24 so as to allow movement within a predetermined range in the X direction and restrict movement in the Y direction and Z direction.

The frame portion 25 includes protrusions 25*a* that are contained in the notches 23*a* of the first slide portion 23 and protrude toward the operation portion support portion 22. The protrusions 25*a* are in contact with the ends on the rear surface side (−Y direction in the drawing) of the protrusions 22*a* of the operation portion support portion 22 in the notches 23*a*. Accordingly, movement in the −Y direction of the operation portion support portion 22 is restricted.

Movement in the Y direction and ±X directions of the operation portion support portion 22 is restricted by the first slide portion 23. Also, the operation portion support portion 22 can move in the Z direction between a position of being in contact with the cover 15 and a position at which the protrusions 22*a* are in contact with the bottom surface of the notch 23*a* of the first slide portion 23. That is, movement in the ±X directions and the ±Y directions of the operation portion support portion 22 is restricted, whereas movement within a predetermined range in the ±Z directions is allowed.

The biasing member 26 is composed of an elastic member such as a spring, is arranged in a state of being contracted in the X direction inside of the second slide portion 24, and has one end fixed to the frame portion 25 and the other end in contact with the second slide portion 24. Accordingly, the second slide portion 24 is biased in the −X direction (direction opposite to the X direction that is the movement direction of the second slide portion 24 during a pressing operation) to the frame portion 25 by the biasing member 26.

Figure 7A:
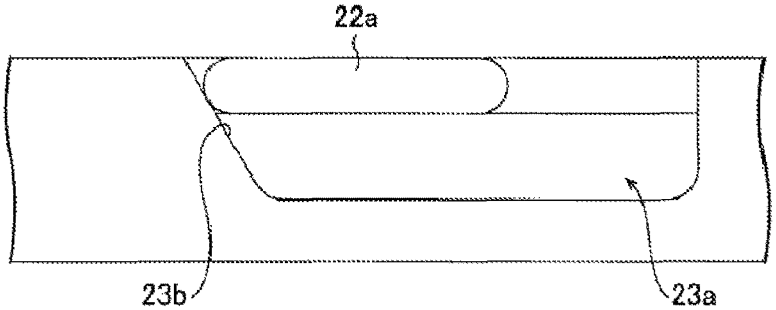
FIGS. 7A and 7B are diagrams illustrating a relationship between a protrusion of the operation portion support portion and a notch of the first slide portion, which are included in the operation button shown in FIG. 2, FIG. 7A showing a state at a time when a pressing operation is not being performed on the operation portion, and FIG. 7B showing a state at a time when a pressing operation is being performed on the operation portion.
Figure 7B:
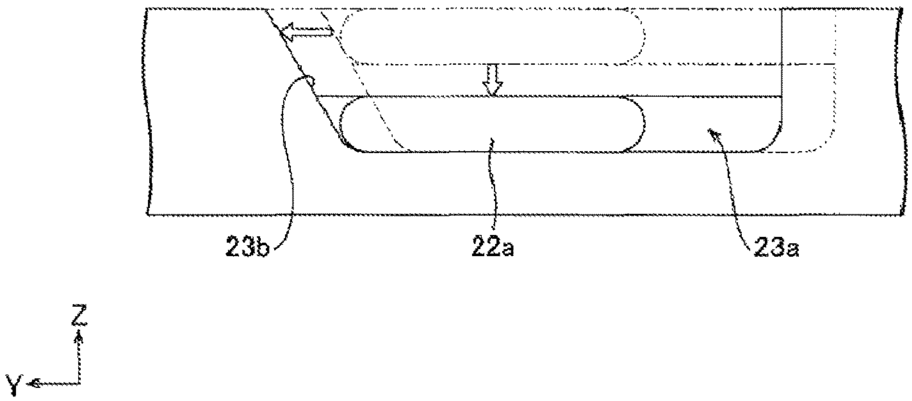
Figure 8A:
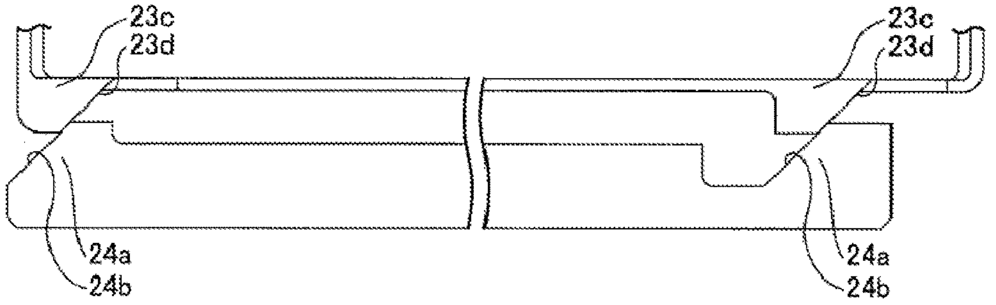
FIGS. 8A and 8B are diagrams illustrating a relationship between a protrusion of the first slide portion and a protrusion of the second slide portion, which are included in the operation button shown in FIG. 2, FIG. 8A showing a state at a time when a pressing operation is not being performed on the operation portion, and FIG. 8B showing a state at a time when a pressing operation is being performed on the operation portion.
Figure 8B:
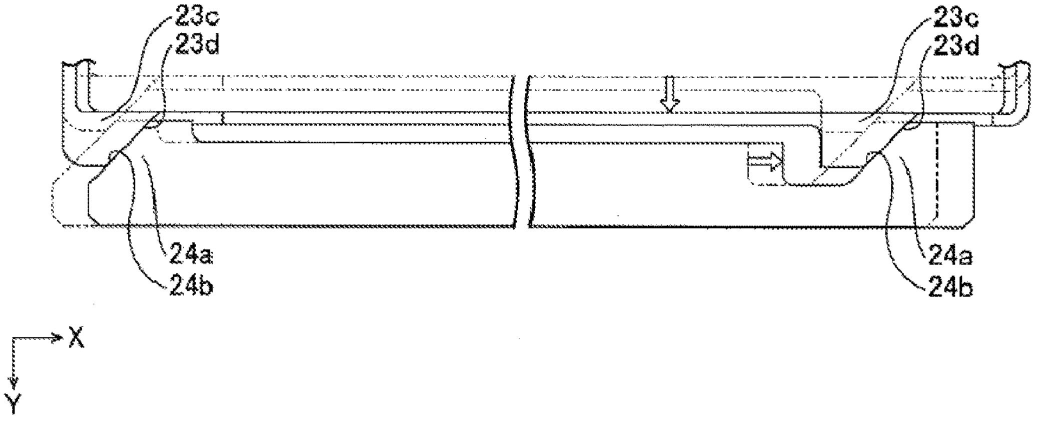
Figure 9A:
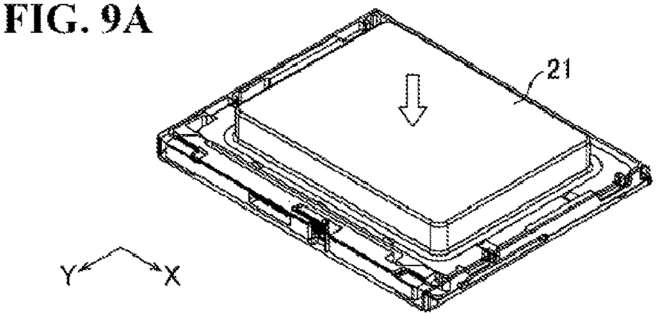
FIGS. 9A to 9C are diagrams illustrating operations of the units at a time when the operation button shown in FIG. 2 is pressed.
Figure 9B:
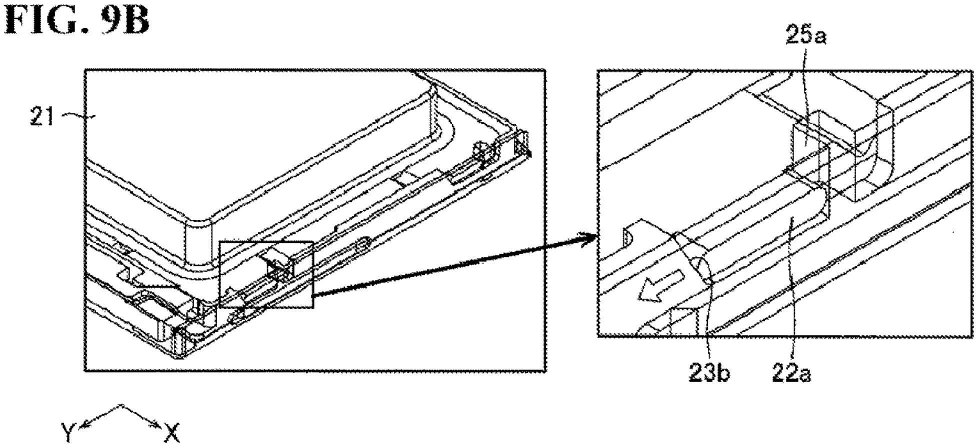
Figure 9C:
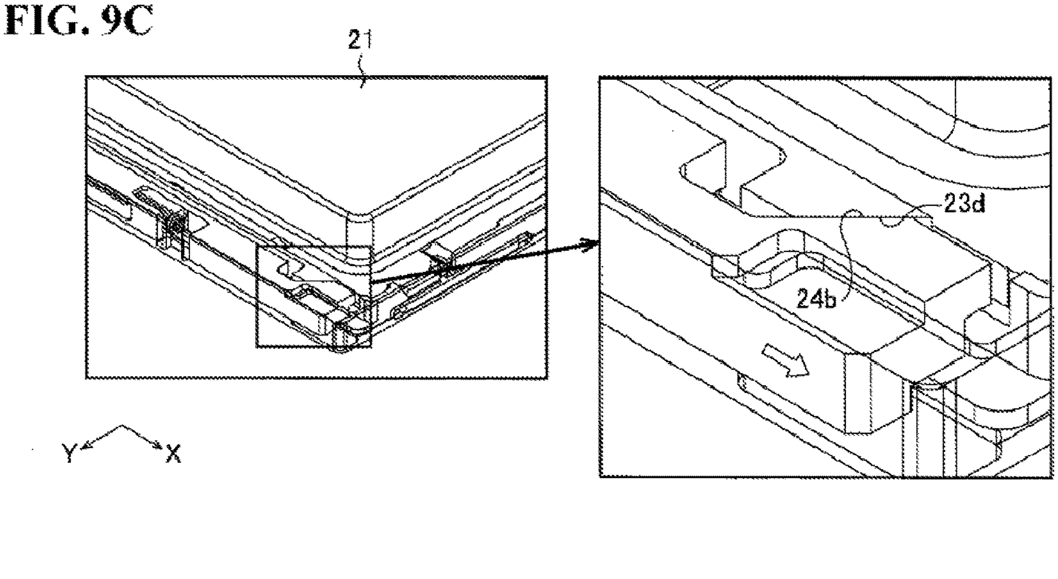
Figure 10A:
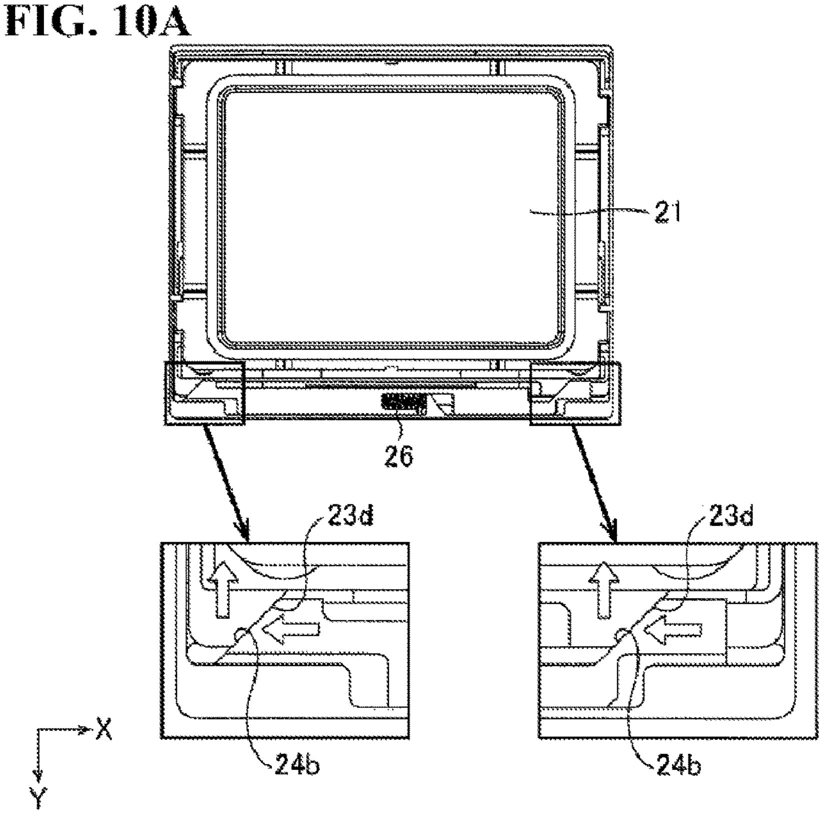
FIGS. 10A to 10C are diagrams illustrating operations of the units at a time when the pressing operation of the operation button shown in FIG. 2 is released.
Figure 10B:
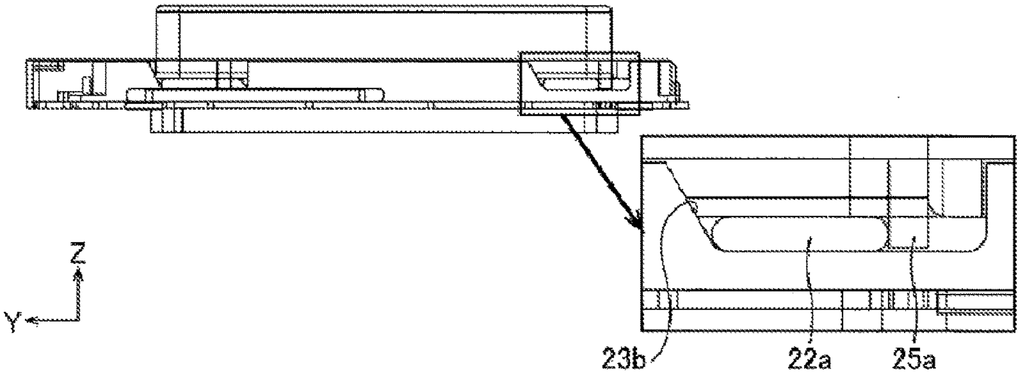
Figure 10C:
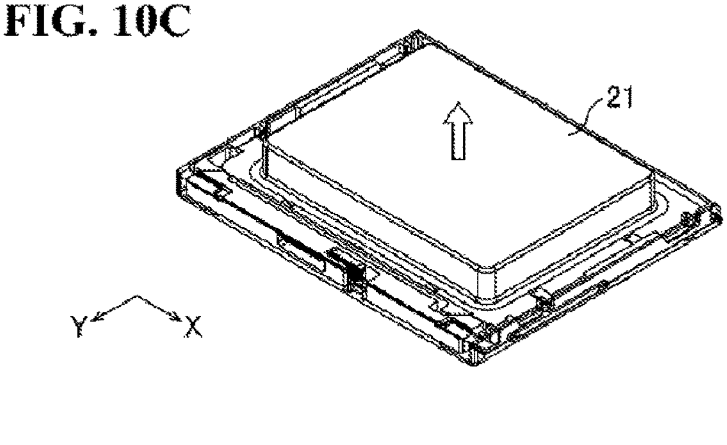

FIGS. 7A and 7B are diagrams illustrating a relationship between a protrusion 22*a* of the operation portion support portion 22 and a notch 23*a* of the first slide portion 23, FIG. 7A showing a state when a pressing operation is not being performed on the operation portion 21, and FIG. 7B showing a state when a pressing operation is being performed on the operation portion 21. Also, FIGS. 8A and 8B are diagrams illustrating a relationship between the protrusions 23*c* of the first slide portion 23 and the protrusions 24*a* of the second slide portion 24, FIG. 8A showing a state when a pressing operation is not being performed on the operation portion 21, and FIG. 8B showing a state when a pressing operation is being performed on the operation portion 21. Also, FIGS. 9A to 9C are diagrams illustrating the operations of portions at a time of performing a pressing operation on the operation portion 21, and FIGS. 10A to 10C are diagrams illustrating the operation of portions at a time of releasing a pressing operation of the operation portion 21.

As shown in FIG. 6, the operation portion support portion 22 and the first slide portion 23 are frame-like members that are approximately rectangular, and the operation portion support portion 22 is contained inside of the first slide portion 23.

As shown in FIG. 7A, the protrusion 22*a* of the operation portion support portion 22 is contained in the notch 23*a* of the first slide portion 23. An inclined portion (first inclined portion) 23*b*, which is inclined so as to be more on the −Y direction side (side opposite to the Y direction, which is the moving direction of the first slide portion 23 during a pressing operation) the lower it is (in the Z direction), is formed on an end on the Y direction side of each notch 23*a*.

If a pressing operation is not being performed on the operation portion 21, as shown in FIG. 7A, the protrusion 22*a* of the operation portion support portion 22 is in contact with a position near the upper end of the inclined portion 23*b* of the first slide portion 23.

Also, when a pressing operation is performed on the operation portion 21 as shown in FIG. 9A, the operation portion 21 is pressed downward, and accompanying this, the protrusions 22*a* of the operation portion support portion 22 move downward as shown in FIGS. 7B and 9B. Accordingly, as shown in FIGS. 7B and 9B, the inclined portions 23*b* of the first slide portion 23 are pressed by the protrusions 22*a* and the first slide portion 23 moves in the Y direction. Note that as shown in FIG. 9B, the ends on the −Y direction side of the protrusions 22*a* of the operation portion support portion 22 are in contact with the protrusions 25*a* of the frame portion 25, and thereby movement in the −Y direction of the operation portion support portion 22 is restricted. Also, movement in the X direction of the operation portion support portion 22 is restricted by the first slide portion 23. For this reason, when a pressing operation is performed on the operation portion 21, the operation portion 21 and the operation portion support portion 22 move in parallel in the Z direction in a state in which movement in the X direction and the Y direction is restricted.

Also, as shown in FIG. 8A, the protrusions 23*c* that protrude toward the Y direction are provided at two locations on a side surface on the Y direction side (side of surface opposing the second slide portion 24) of the first slide portion 23. The protrusions 23*c* are such that inclined portions (second inclined portions) 23*d*, which are inclined so as to be more on the −X direction side the further toward the Y direction side they are in a view from above, are formed on side surfaces on the X direction side.

The protrusions 24*a* that protrude toward the −Y direction side are formed at positions in the second slide portion 24 that correspond to the protrusions 23*c* of the first slide portion 23. The protrusions 24*a* are such that inclined portions (third inclined portion) 24*b*, which are inclined so as to be more on the −X direction side the further toward the Y direction side they are in a view from above, are formed on side surfaces on the −X direction side. Note that the inclined portions 23*d* of the first slide portion 23 and the inclined portions 24*b* of the second slide portion 24 are arranged so as to be approximately parallel with each other.

As shown in FIG. 8A, the first slide portion 23 and the second slide portion 24 are arranged such that when a pressing operation is not being performed on the operation portion 21, regions near the ends on the Y direction side of the inclined portions 23*d* of the first slide portion 23 come into contact with regions near the end on the −Y direction side of the inclined portions 24*b* of the second slide portion 24.

Accordingly, when a pressing operation is performed on the operation portion 21 and the first slide portion 23 moves in the Y direction, as shown in FIGS. 8B and 9C, the inclined portion 24*b* of the second slide portion 24 is pressed by the inclined portion 23*d* of the first slide portion 23, and the second slide portion 24 overcomes the biasing force of the biasing member 26 and moves in the X direction. As a result, the player performing the pressing operation can be provided with a moderate operation feeling (clicking feeling) due to the elastic force of the biasing member 26 and the sliding resistance of the operation portion support portion 22, the first slide portion 23, and the second slide portion 24.

If the pressing operation performed by the user is released, as shown in FIG. 10A, the second slide portion 24 is pressed in the −X direction by the elastic force of the biasing member 26, and the inclined portions 24*b* of the second slide portion 24 press the inclined portions 23*d* of the first slide portion 23, whereby the first slide portion 23 moves in the −Y direction. Accordingly, as shown in FIG. 10B, the protrusions 22*a* of the operation portion support portion 22 are pressed upward by the inclined portions 23*b* of the first slide portion 23, and as shown in FIG. 10C, the operation portion support portion 22 and the operation portion 21 are returned to a predetermined standby position, which is the same as the position prior to the pressing operation being performed.

As described above, the operation unit 10 according to the present embodiment includes: the operation portion 21 and the operation portion support portion 22 (button portion) that move in the Z direction (first direction) in response to a pressing operation performed by a user; a first slide portion 23 that is arranged at a position covering the periphery in directions orthogonal to the Z direction (X direction and Y direction) of the operation portion support portion 22 and moves in the Y direction (second direction) orthogonal to the Z direction due to the operation portion 21 and the operation portion support portion 22 moving in the Z direction; a second slide portion 24 that is arranged at a position adjacent in the Y direction to the first slide portion 23 and moves in the X direction (third direction) orthogonal to the Z direction and the Y direction due to the first slide portion 23 moving in the Y direction; and a biasing member 26 that biases the second slide portion 24 in a direction of preventing movement in the X direction of the second slide portion 24.

Accordingly, when the user performs a pressing operation in the Z direction on the operation portion 21, the operation portion 21 and the operation portion support portion 22 move in the Z direction in response to the pressing operation, the first slide portion 23 moves in the Y direction in response, and the second slide portion 24 overcomes the biasing force of the biasing member 26 and moves in the X direction in response. For this reason, it is possible to provide the user with an intuitive operation feeling (clicking feeling).

Also, with the above-described configuration, the first slide portion 23, the second slide portion 24, and the biasing member 26 can be arranged at positions around the operation portion 21 and the operation portion support portion 22 in a view in the Z direction. Accordingly, because there is no need to provide an elastic member or the like at a position overlapping with the button portion (operation portion 21 and operation portion support portion 22) in a view in the Z direction, the operation unit can be made thinner.

Also, in the present embodiment, two protrusions 22*a* that protrude in the X direction and two protrusions 22*a* that protrude in the −X direction are provided with equal gaps therebetween on the operation portion support portion 22, the first slide portion 23 is formed into a frame shape, and notches 23*a* that contain the protrusions 22*a* are provided at positions corresponding to the protrusions 22*a*. Accordingly, due to the movement of the operation portion support portion 22 in response to the pressing operation performed by the user, the load applied to the first slide portion 23 can be applied to the first slide portion 23 in a manner of being dispersed in the XY plane. For this reason, the first slide portion 23 can be moved parallel to the Y direction without causing rotation in the first slide portion 23. Accordingly, because it is possible to suppress a case in which the operation portion 21 inclines and to smoothly move the operation portion 21 in a direction parallel to the pressing direction, the operability of the operation unit 10 can be improved.

Also, in the present embodiment, the first slide portion 23 includes multiple inclined portions (second inclined portions) 23*d* at positions separated by a predetermined gap in the X direction, and the second slide portion 24 includes inclined portions (third inclined portions) 24*b* at positions corresponding to the inclined portions 23*d*.

Accordingly, the load applied to the second slide portion 24 due to the movement of the first slide portion 23 can be applied to the second slide portion 24 in a manner of being dispersed over multiple positions in the X direction. Accordingly, it is possible to suppress rotation from occurring in the second slide portion 24, and to move the second slide portion 24 parallel to the X direction. For this reason, the operation portion 21, the operation portion support portion 22, the first slide portion 23, and the second slide portion 24 can be moved smoothly.

Also, with the present embodiment, even if a pressing operation is performed near the edge of the operation portion 21, the entirety of the operation portion 21 and the operation portion support portion 22 can be moved smoothly in the Z direction. For example, let it be assumed that a pressing operation is performed near the end on the left front surface side of the operation portion 21 (assuming that the −X direction side in the drawing is the left side and the Y direction side is the front surface side). In this case, mainly, the first slide portion 23 is pressed in the Y direction by the protrusion 22*a* on the left front surface side near the position at which the pressing operation was performed, whereby the left-side side of the first slide portion 23 moves in the Y direction, and the second slide portion 24 is pressed in the X direction. At this time, the second slide portion 24 moves in the X direction, and the biasing forced applied by the second slide portion 24 to the right-side side of the first slide portion 23 is reduced. As a result, the right-side side of the first slide portion 23 also becomes easier to move in the Y direction, and the entirety thereof moves in the Y direction without the first slide portion 23 deforming. Also, due to the entirety of the first slide portion 23 moving in the Y direction, the force with which the first slide portion 23 resists the movement in the −Z direction of the protrusions 22*a* arranged at positions (left rear surface side, right front surface side, right rear surface side) different from the end on the left front side at which the pressing operation was performed is reduced. As a result, the protrusions 22*a* arranged at positions different from the edge on the left front surface side at which the pressing operation was performed move in the Z direction as well. That is to say, the entirety of the operation portion 21 and the operation portion support portion 22 can move smoothly in the Z direction.

The present invention is not limited to the above-described embodiment, and can be modified in various ways without departing from the scope of the claims. That is to say, embodiments achieved by combining technical means that have been modified as appropriate without departing from the scope indicated in the claims are included in the technical scope of the present invention as well.

INDUSTRIAL APPLICABILITY

The present invention can be applied to an operation unit that receives a pressing operation from a user, and a game machine including the same.

The invention claimed is:

1. An operation unit comprising:

a button portion configured to move in a first direction, which is a pressing direction, in response to a pressing operation performed by a user;

a first slide portion that is arranged around the button portion and is configured to move in a second direction orthogonal to the first direction due to the button portion moving in the first direction;

a second slide portion that is arranged at a position adjacent in the second direction to the first slide portion and is configured to move in a third direction orthogonal to the first direction and the second direction due to the first slide portion moving in the second direction; and a biasing member that biases the second slide portion in a direction of preventing movement in the third direction of the second slide portion.

2. The operation unit according to claim 1, wherein the button portion includes a protrusion that protrudes in a direction approximately parallel with the third direction, the first slide portion includes a notch configured to contain the protrusion, on a surface on the second direction side of the notch, the notch includes a first inclined portion that is inclined so as to be located further away from the second slide portion the further in the first direction it is, and due to the protrusion sliding against the first inclined portion when the button portion moves in the first direction in response to a pressing operation performed by a user, the first inclined portion is pressed by the protrusion, and the first slide portion moves in the second direction.

3. The operation unit according to claim 2, wherein the button portion includes a plurality of said protrusions that protrude in the third direction and a plurality of said protrusions that protrude in a direction opposite to the third direction, and the first slide portion includes a plurality of said notches in correspondence with the protrusions.

4. The operation unit according to claim 2, wherein on a surface opposing the second slide portion, the first slide portion includes a second inclined portion that is inclined so as to be located more toward a side opposite to the third direction the further in the second direction it is, at a position of coming into contact with the second inclined portion, the second slide portion includes a third inclined portion that is formed approximately parallel to the second inclined portion, and due to the second inclined portion sliding against the third inclined portion when the first slide portion moves in the second direction, the third inclined portion is pressed by the second inclined portion, and the second slide portion moves in the third direction.

5. The operation unit according to claim 4, wherein the first slide portion includes a plurality of said second inclined portions at positions separated by a predetermined gap in the third direction, and the second slide portion includes a plurality of said third inclined portions in correspondence with the second inclined portions.

6. The operation unit according to claim 1, wherein when the pressing operation performed by the user is released, due to the biasing force of the biasing member, the second slide portion, the first slide portion, and the button portion are caused to return to a predetermined location that is the same as a position prior to a pressing operation being started.

7. The operation unit according to claim 1, further comprising a display portion arranged at a position on the first direction side relative to the button portion, wherein at least a portion of the button portion is a light transmitting portion composed of a material with a property of transmitting light, and an image displayed on the display unit can be viewed via the light transmitting portion.

8. A game machine comprising the operation unit according to claim 1.

* * * * *